United States Patent
Friess

[15] 3,659,074
[45] Apr. 25, 1972

[54] ELECTRIC RESISTANCE WELDER AND METHOD

[72] Inventor: Richard G. Friess, San Marcos, Calif.
[73] Assignee: Hughes Aircraft Company, Culver City, Calif.
[22] Filed: Apr. 13, 1970
[21] Appl. No.: 27,888

[52] U.S. Cl..................................219/111, 219/86, 219/115
[51] Int. Cl..........................................................B23k 11/24
[58] Field of Search.................................219/108–116, 86, 219/117

[56] References Cited
UNITED STATES PATENTS

| | | | |
|---|---|---|---|
| 2,306,229 | 12/1942 | Somerville | 219/117 X |
| 2,066,668 | 1/1937 | Bennett | 219/50 |
| 2,392,101 | 1/1946 | Ringer | 219/116 |
| 2,826,674 | 3/1958 | Peras | 219/111 X |
| 3,408,473 | 10/1968 | Gilbert | 219/111 |
| 3,436,514 | 4/1969 | Broomhall et al. | 219/113 |

Primary Examiner—J. V. Truhe
Assistant Examiner—L. A. Schutzman
Attorney—James K. Haskell and Allen A. Dicke

[57] ABSTRACT

Resistance welder supplies an AC preheat current to the workpiece, followed by a DC weld pulse.

8 Claims, 2 Drawing Figures

ELECTRIC RESISTANCE WELDER AND METHOD

BACKGROUND

This invention is directed to a resistance welder which sequentially supplies AC and DC current to the workpiece for preheating and welding.

The employment of alternating current for resistance welding, or spot welding, is well-known. A considerable amount of such equipment is available in the marketplace. An alternating current pulse train of sufficient magnitude and sufficient duration to cause resistance heating of metal parts lying next to each other causes melting of the facing surfaces. Despite careful control to provide adequate but not excessive power, such alternating current welding tends to leave a burned area around the weld spot.

Also known in the art are direct current welders which supply a single direct current pulse of sufficient energy to melt the adjoining faces of metal parts to be welded, with consequent joining. The large pulse in DC welding sets up large local magnetic fields which tend to spatter liquid metal from the pool which has been melted by the pulse. In both the cases of AC and DC welding, reducing the power to the minimum value which produces a satisfactory weld still causes these undesirable features.

SUMMARY

In order to aid in the understanding of this invention, it can be stated in essentially summary form that it is directed to a method and apparatus for the welding of adjoining metal parts by the sequential application of an AC train of sufficient magnitude and duration to preheat the parts preparatory to welding, followed by the application of a DC pulse of sufficient energy to cause welding of the parts.

Accordingly, it is an object of this invention to provide an AC–DC welder for the welding of metal parts lying in association with each other. It is a further object to provide a welder which supplies an AC signal through the associated parts of sufficient power to preheat the parts, followed by a DC pulse of sufficient power to cause melting of the associated parts to cause welding therebetween. It is another object to provide a combination AC-DC welder where the AC pulse is insufficient to cause welding, and the following DC pulse is of insufficient energy to cause welding, if the parts are not preheated to thus avoid burning adjacent the weld area and to avoid splashing of the weld-metal pool. It is still another object to provide an AC–DC welder which is economic of construction and yet produces optimum welds of adjacent metallic workpieces. Other objects and advantages of this invention will become apparent from a study of the following portion of the specification, the claims and the attached drawings.

DESCRIPTION

Figure 2:
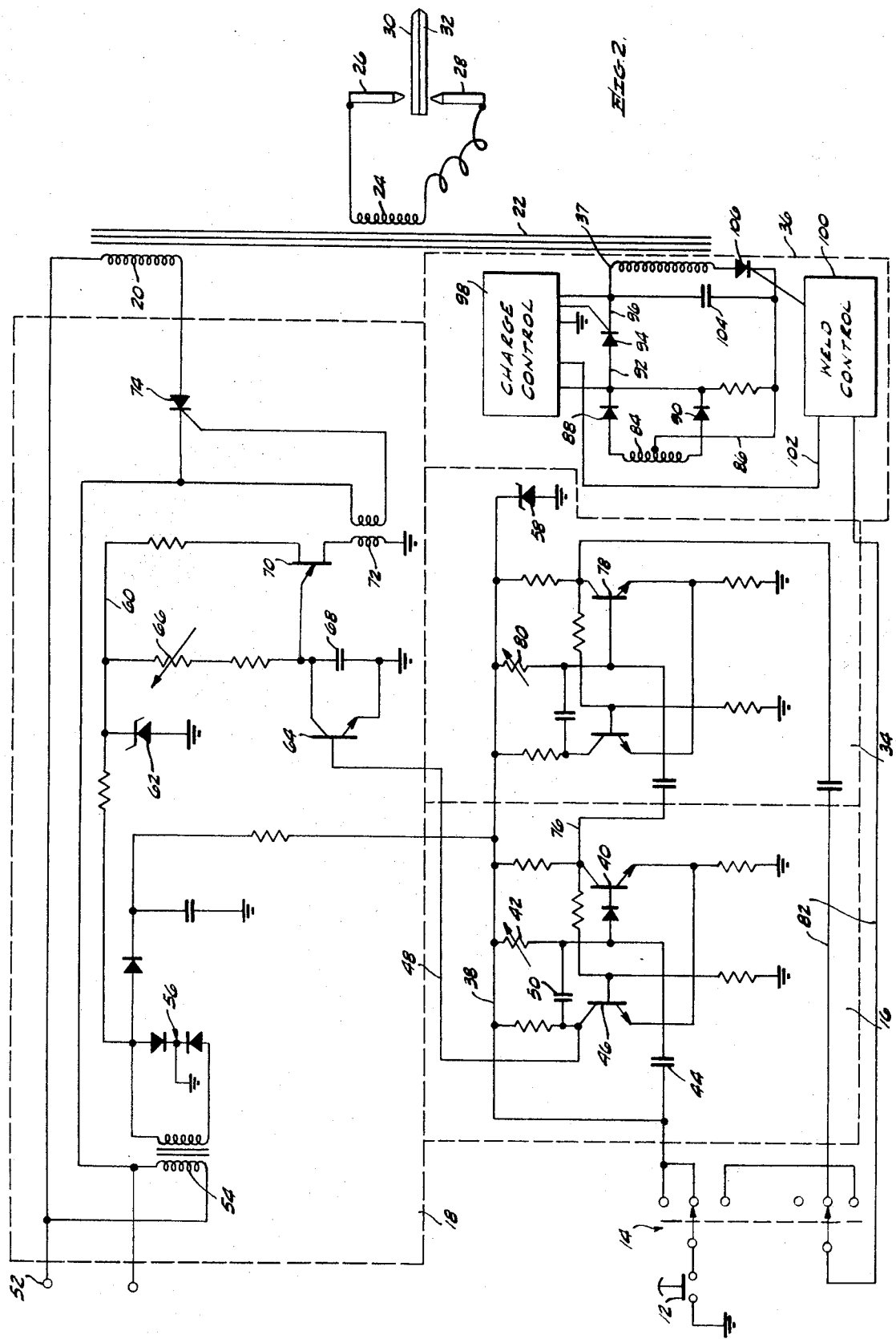
FIG. 2 is an electrical schematic diagram of the welder of this invention.

Referring to the drawings, the weld control circuit of the welder 10 of this invention is illustrated as being comprised of an actuator switch 12, which is connected to selector switch 14, see FIG. 2, which is, in turn, connected to the AC duration control circuit 16. One output of the AC duration control circuit 16 goes to AC control circuit 18 which has its output to AC primary 20 of weld transformer 22. Weld transformer 22 is of such nature as to have primary inputs of relatively high voltage and low current which produce outputs in secondary 24 of fairly low voltage and high current. Connected to the secondary 24 are welding electrodes 26 and 28 which are adapted to be moved against workpieces 30 and 32. As in conventional practice, the welding electrodes engage the workpieces with sufficient force to provide adequate electrical contact and, in some cases, to provide sufficient clamping force to aid in producing inter-workpiece engagement for enhancing both electrical contact therebetween and maintaining clamping during the weld heating and cooling cycle. Such is available in conventional welders.

Another output of the AC duration control circuit 16 goes to delay circuit 34 which, in turn, has its output through selector switch to DC control circuit 36. The output of the DC control circuit 36 goes to a second primary 37 on weld transformer 22.

Selector switch 14 has two switch arms which are connected together to move together, and each of the switch arms has three positions. As is seen in FIG. 2, in the upper position, actuation of switch 12 actuates only the AC welder. In the bottom position, actuation of switch 12 actuates only the DC welder portion of the circuit. The central position of the selector switch 14 is connected so that closure of actuator switch 12 causes the circuitry to first actuate the AC welder portion of the circuit for an appropriate period at an appropriate amplitude followed, after suitable delay, by actuation of the DC control circuit. AC duration control circuit 16 is provided with a positive power line 38. Transistor 40 is connected between the positive power line and the ground through collector and emitter resistances. Its base is connected to the positive power line 38 through variable resistance 42 which acts to control the duration of the AC cycle. Since the base is so connected, until actuator switch 12 is closed, which is also connected to the base of transistor 40, the base voltage builds up. With the base built up in voltage substantially to the voltage of positive power line 38, the transistor 40 is on so that its collector is substantially at ground voltage. When actuator switch 12 is closed, a negative-going pulse is conveyed through capacitor 44 to the base of transistor 40 to render the transistor 40 nonconductive.

Transistor 46 has its collector connected through a collector resistance to the DC positive power line 38 and has its emitter connected to the emitter of transistor 40. Thus, when transistor 40 changes from its quiescent conductive state to its actuated nonconductive state, the emitter voltage on transistor 46 goes down. At the same time, since the base of transistor 46 is connected to the collector of transistor 40, the base voltage on transistor 46 goes up to result in turnon of transistor 46. This results in collector line 48 going toward zero. Timing capacitor 50 is connected between collector line 48 and the base of transistor 40. When collector line 48 goes down in voltage, capacitor 50 is discharged and can be charged through resistance 42. Thus, the value of the variable resistor 42 controls the charging time of capacitor 50. When the capacitor 50 charges to an adequate value, its connection to the base of transistor 40 causes transistor 40 to again become conductive to signal the end of time of the AC duration.

Conventional alternating current supply 52 (such as a 115 volt, 60 cycle line) supplies the primary of control circuit power supply transformer 54. The output of the transformer 54 is rectified by conventional fullwave rectifier diodes 56 to supply filtered current to positive power line 38, which is controlled by zener regulator 58. The rectified current from the power transformer 54 is also supplied through unfiltered line 60, which is clipped at maximum voltage by zener regulator 62. Thus, the voltage in line 60 has a maximum positive voltage limit with downwardly-directed spikes reaching zero volts. These spikes are synchronized with the input AC voltage of supply 52.

Collector line 48 is connected to the base of transistor 64, which has its emitter connected to ground and its collector connected to line 60 through variable resistance 66. The collector of transistor 64 also is connected to capacitor 68, which has its other side connected to ground to form an RC network. The collector of transistor 64 is connected to the emitter of unijunction transistor 70. Unijunction transistor 70 has its base 2 connected through a resistor to positive supply line 60 and has its base 1 connected to ground through the primary of pulse transformer 72.

Since the voltage of line 48 has been high, before closure of actuator switch 12, transistor 64 has been conducting. When the AC duration circuit was energized, the voltage in line 48 decreased, to cut off transistor 64. This permits the current flow from line 60 through resistor 66 to charge capacitor 68, increasing the emitter voltage on unijunction transistor 70. The ramp slope is a function of setting of variable resistor 66, so that oscillation rate is controlled. When the emitter of unijunction transistor 70 reaches an adequate voltage, usually about one-half the voltage between base 1 and base 2, the unijunction transistor becomes conductive from emitter to base 1. Discharge of capacitor 68 causes a pulse through pulse transformer 72. This pulse is in synchronism with the AC power line so that the pulse transformer can serve as a gate connection to SCR 74.

SCR 74 is serially connected with the AC power source and with primary 20 on weld transformer 22. Thus, the point at which SCR 74 is fired on its wave is a function of the setting of resistance 66. Furthermore, SCR 74 fires at every positive-going wave until the AC duration control circuit 16 times out, and the line 48 becomes more positive to cause conduction of transistor 64.

To accomplish the DC discharge to the weld transformer, it is desirable to delay firing of the DC control circuit for a short while, in order to prevent firing of the DC while the transformer is saturated from previous AC cycling. Delay circuit 34 is shown as an adjustable delay one-shot multivibrator, identical to the AC duration control circuit 16. The reason for delay is that, if no delay has been provided, SCR 74 may have just been fired to saturate weld transformer 22, so that, with an immediate firing of the DC pulse, may result in firing it into a saturated transformer. Thus, delay to permit the desaturation of the transformer is necessary to make sure that the sequential operation is fully effective. Thus, any delay circuit can be substituted for the delay circuit 34, providing it is of such nature as to provide a half-cycle delay after timing out of control circuit 16.

Referring to FIG. 2, the delay circuit 34 is identical to the AC duration circuit 16. When the AC duration circuit 16 times out, line 76 connected between the collector of transistor 40 and the circuit 34 has a negative-going spike which, similarly to the previously-described circuit 16, causes transistor 78 to be nonconductive for a period determined by variable resistor 80 and, when it again goes conductive, a negative-going spike is produced in line 82 which causes actuation of the DC control circuit 36.

Figure 1:
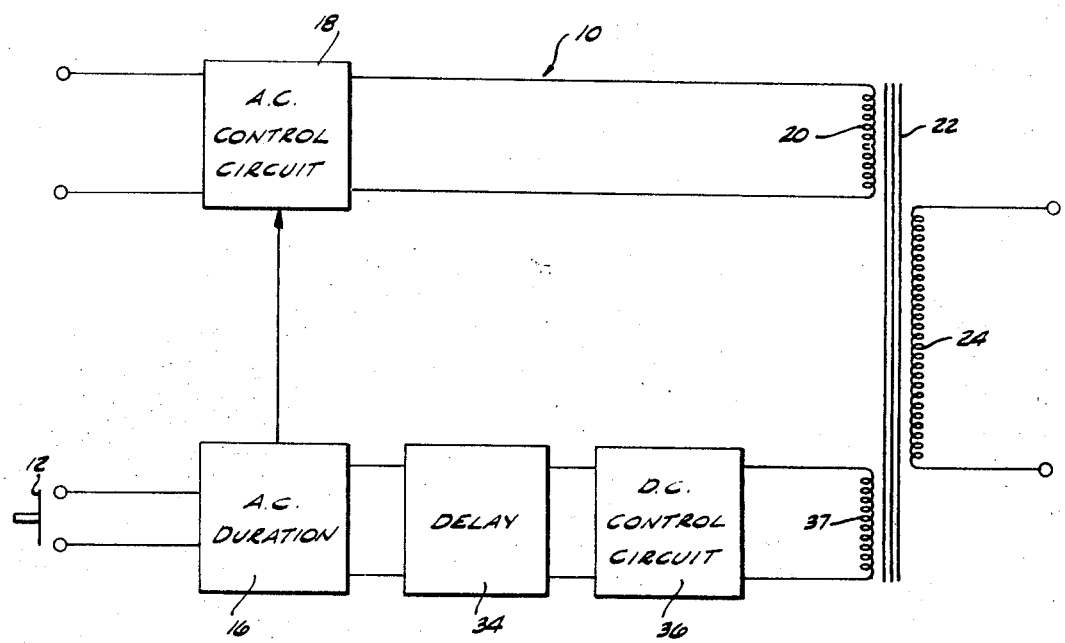
FIG. 1 is a schematic block diagram of the welder of this invention.

The DC control circuit 36 is indicated in block diagram in FIG. 1 and is indicated generally by that number in FIG. 2. Transformer secondary 84 is energized from any convenient AC source, such as that supplied to transformer 54. Transformer secondary 84 is center-tapped to provide negative bus 86, which is conveniently at ground potential. Transformer secondary 84 has its ends connected to diodes 88 and 90, which are both connected to unregulated positive bus 92. SCR 94 is connected between unregulated positive bus 92 and regulated positive bus 96. SCR 94 has its gate connected to charge control circuit 98. The charge control circuit receives its signal from the unregulated bus, the regulated bus and the ground potential. Additionally, line 82 is connected to weld control circuit 100, which has a signal line 102 connected to aid in the control of the charge control 98. The charge control circuit is conventional, or could be that which is shown in U.S. Pat. application Ser. No. 819,8321, filed Apr. 28, 1969, by Malcolm M. Oakes, entitled "Capacitor Charge Circuit." The weld control circuit 100 is conventional or could be that disclosed in U.S. Pat. application Ser. No. 14,421, filed Feb. 26, 1970, by Richard G. Friess and Tor Hougen, entitled "SCR Turn-Off Circuit."

Capacitor 104 is connected between regulated positive bus 96 and negative bus 86. The purpose of SCR 94, and its charge control 98, is to charge up the capacitor 104 to a predetermined value. The charge control regulates the SCR to accomplish this purpose. Secondary 37 is connected in series with SCR 106 and between buses 96 and 86. Thus, when SCR 106 is fired by weld control 100, the capacitor 104 discharges through primary 37 to causes a DC weld pulse between electrodes 26 and 28.

As a specific example of the values of the elements of the circuit, Table I is presented below. The values of the elements which are not recited are suitably compatible.

TABLE I

| Reference No. | Item | Identification |
|---|---|---|
| 22 | Weld Transformer | 24 to 1 Turns Ratio on both primaries |
| 38 | Positive Power Line | +16 volts |
| 40 | Transistor | 2N 2712 |
| 42 | Variable Resistance | 2K–52K ohms |
| 46 | Transistor | 2N 2712 |
| 50 | Capacitor | 10 Microfarads |
| 56 | Diodes | SCE 2 |
| 58 | Zener diode | 18 volts |
| 62 | Zener diode | 18 volts |
| 64 | Transistor | 2N 2712 |
| 66 | Variable Resistor | 839K–89K ohms |
| 68 | Capacitor | 0.1 Microfarads |
| 70 | Unijunction Transistor | 2N 1671 |
| 72 | Pulse Transformer | 1–1 turns ratio |
| 74 | SCR | 2N 398 |
| 78 | Transistor | 2N 2712 |
| 80 | Variable Resistor | 2K–22K ohms |
| 88 | Diode | 15A–600 V) such as 1N3214 |
| 90 | Diode | 15A–600 V) |
| 94 | SCR | 2N 3898 |
| 104 | Capacitor | 6 250 mfd 0 450 V |
| 106 | SCR | 2N 3898 |

In operation, the workpieces 30 and 32 are placed between the electrodes and selector switch 14 is set for the desired function. Assuming that the AC input to electrodes 26 and 28 is first desired, followed after an interval by a DC pulse, selector switch 14 is set in the middle position, shown. The duration of the AC signal is set on variable resistor 42 and the amplitude of the signal is set on variable resistor 66. Variable resistor 80 is set to determine the amount of time delay between the end of the AC input and the firing of the DC pulse. After the settings are accomplished, actuator switch 12 is closed. This causes firing of SCR 74 at the proper point in the AC cycle to provide the desired amplitude, the pulse train continuing for the duration, as determined by the setting of resistor 42. After the pulse train is terminated, at conclusion of the AC signal, delay circuit 34 delays the DC firing for an appropriate length of time. Thereupon, SCR 106 is made conductive by weld control 100 to cause the DC weld pulse.

As described above, the use of both AC and DC, in that sequence, permits preheating of the workpieces by the AC signal, at a level below that which would cause a weld, followed by a DC weld pulse which would be inadequate to cause a weld, if preheating had not been employed. Welding any two pieces of metal together requires sufficient energy in the weld pulse to flow the metal but, in many cases, before this energy level can be reached, the bad effects start interfering, such as splattering away the metal or burning. This system simply allows bonding below these high energy levels which produce the unwanted affects. An example of welding for which this welder and method is particularly useful is welding a fine wire to a more massive body. A too high energy pulse will splatter away the molten material and leave a crater effect on each side of the wire. As a result, little contact area is achieved and this is detrimental when passing high currents through the wire or where structural strength is desired.

This invention having been described in its preferred embodiment, it is clear that it is susceptible to numerous modifications and embodiments within the ability of those skilled in the art and without the exercise of the inventive faculty.

What is claimed is:

1. A welder for spot welding together weldable material, said welder comprising:
   first and second electrode means for engagement on the weldable material for the passage of current through the weldable material for the welding thereof;
   an alternating current weld means connected to said first and second electrodes for the passage of a plurality of electrical pulses between said first and second electrodes for a sufficient time and at a sufficient amplitude to preheat the weldable material;
   direct current weld means connected to discharge direct current between said first and second electrodes and through the workpiece for welding the weldable material; and
   control means for sequentially activating said alternating current weld means and said direct current weld means, said control means including delay means to delay the start of direct current flow between said first and second electrodes for a predetermined time after cessation of the electrical pulses from said alternating current weld means so that the electrical pulses from said alternating current weld means cause preheat of the weldable material and the direct current through the weldable material causes welding thereof.

2. The welder of claim 1 wherein said control means includes means for control of the duration of the electrical pulses from said alternating current weld means, said means for control of the duration of the electrical pulses from said alternating current weld means comprises a one-shot multivibrator with an adjustable time constant.

3. The welder of claim 2 wherein said delay means for delaying the direct current until after cessation of the electrical pulses from said alternating current weld means comprises a one-shot multivibrator having an adjustable time device.

4. The welder of claim 1 wherein said welder includes a transformer secondary having said first and second electrodes in series therewith, first and second transformer primaries in electromagnetic coupling with said secondary, said first transformer primary being energized by said alternating current weld means and said second transformer primary being energized by said direct current weld means.

5. A welder for spot welding together weldable material, said welder comprising:
   first and second electrodes for engagement on the weldable material, a transformer secondary connected in series with said first and second electrodes for the passage of current through the weldable material for the welding thereof;
   an alternating current weld means including a first transformer primary in electromagnetic coupling 6. The welder of claim 5 wherein said control means includes means for control of the duration of the AC pulse train, said means for control of the duration of the electrical pulses from said alternating current weld means comprises a one-shot multivibrator with an adjustable time constant.

7. The welder of claim 6 wherein said delay means for delaying the direct current until after cessation of the electrical pulses from said alternating current weld means comprises a one-shot multivibrator having an adjustable time device.

8. A welder for spot welding together weldable material, said welder comprising:
   means for engagement on the weldable material for the passage of electric current through the engagement means and through the weldable material for the welding thereof, said means for engagement comprising first and second electrodes;
   means connected to said first and second electrodes for the passage of a plurality of electrical pulses between said first and second electrodes for a sufficient time and at a sufficient amplitude to preheat the weldable material, but insufficient to cause welding thereof, said means comprising alternating current source weld means;
   means connected to said first and second electrodes for discharging direct current between said first and second electrodes and through the workpiece with sufficient energy for welding the weldable material when it is preheated by said alternating current source weld means, and insufficient to cause welding when not preheated by said alternating current source weld means; and
   means for sequentially activating first said alternating current source weld means and subsequently said direct current weld means while the weldable material is still preheated, including means for delaying the activation of the start of direct current discharge between said electrodes from said direct current weld means for a predetermined time after cessation of the electrical pulses from said alternating current source weld means, so that the electrical pulses from said alternating current source weld means cause preheat of the weldable material and the direct current through the weldable material causes welding thereof.

* * * * *

PO-1050
(5/69)

UNITED STATES PATENT OFFICE
CERTIFICATE OF CORRECTION

Patent No. 3,659,074        Dated  April 25, 1972

Inventor(s)  Richard G. Friess

It is certified that error appears in the above-identified patent and that said Letters Patent are hereby corrected as shown below:

Column 4, line 33, delete "mfd 0" and substitute --mfd @-- (page 10, line 24)

Column 6, after line 4, insert --with said transformer secondary, said first transformer primary being energized by said alternating current weld means for the passage of a plurality of electrical pulses between said first and second electrodes for a sufficient time and at a sufficient amplitude to preheat the weldable material;

direct current weld means including a second transformer primary in electromagnetic coupling with said transformer secondar connected to discharge direct current between said first and secon electrodes by energization of said direct current weld means for welding of the weldable material; and control means including delay means to delay the start of direct current flow between said first and second electrodes for a predetermined time after cessation of the electrical pulses from said alternating current weld means for sequentially activating said alternating current weld means and said direct current weld means so that the electrical pulses from said alternating current weld means cause preheated weldable material and the direct curren through the weldable material causes welding thereof.--

Signed and sealed this 27th day of March 1973.

(SEAL)
Attest:

EDWARD M. FLETCHER, JR.                ROBERT GOTTSCHALK
Attesting Officer                      Commissioner of Patents